(12) United States Patent
Fu et al.

(10) Patent No.: US 10,527,436 B2
(45) Date of Patent: *Jan. 7, 2020

(54) SYSTEM AND METHOD FOR ESTIMATING ARRIVAL TIME

(71) Applicant: BEIJING DIDI INFINITY TECHNOLOGY AND DEVELOPMENT CO., LTD., Beijing (CN)

(72) Inventors: Kun Fu, Beijing (CN); Zheng Wang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,118

(22) Filed: Apr. 1, 2019

(65) Prior Publication Data

US 2019/0226855 A1 Jul. 25, 2019

Related U.S. Application Data

(63) Continuation of application No. PCT/CN2017/112520, filed on Nov. 23, 2017.

(51) Int. Cl.
*G01C 21/00* (2006.01)
*G01C 21/34* (2006.01)
(Continued)

(52) U.S. Cl.
CPC ..... *G01C 21/3407* (2013.01); *G01C 21/3484* (2013.01); *G06N 3/04* (2013.01);
(Continued)

(58) Field of Classification Search
CPC ...... G01C 21/3407; G01C 21/34; G06N 3/08; G06N 3/04; G05D 1/0088; G05D 1/0221
(Continued)

(56) References Cited

U.S. PATENT DOCUMENTS 5,839,114 A * 11/1998 Lynch ............... G06Q 10/02
705/5
10,127,496 B1 * 11/2018 Fu ........................ G06N 3/08
(Continued)

FOREIGN PATENT DOCUMENTS

| CN | 104794886 A | 7/2015 |
|---|---|---|
| WO | 2017181932 A1 | 10/2017 |

OTHER PUBLICATIONS

Wide & Deep Learning for Recommender Systems, Cheng et al., Jun. 24, 2016, 4 pages.
(Continued)

*Primary Examiner* — Mahmoud S Ismail
(74) *Attorney, Agent, or Firm* — Bayes PLLC

(57) ABSTRACT

Systems and methods are provided for estimating an arrival time associated with a trip. The exemplary method receives trip information including an origin and a destination of the trip, and determines a route connecting the origin and the destination. The route includes a plurality of road segments. The method then receives transportation information associated with the road segments of the route and extracts global features and local features from the transportation information. Each global feature is indicative of characteristics involving at least two of the road segments, and each local feature is indicative of characteristics related to an individual one of the road segments. The method applies a machine learning model to estimate the arrival time, which includes a first neural network dedicated to process the global features and a second neural network dedicated to (Continued)

process the local features. The first neural network is distinct from the second neural network.

20 Claims, 9 Drawing Sheets

(51) Int. Cl.
*G06N 3/08* (2006.01)
*G06N 3/04* (2006.01)
(52) U.S. Cl.
CPC ......... *G06N 3/0445* (2013.01); *G06N 3/0454* (2013.01); *G06N 3/08* (2013.01)
(58) Field of Classification Search
USPC ......................................................... 701/465
See application file for complete search history.

(56) References Cited

U.S. PATENT DOCUMENTS

| | | |
|---|---|---|
| 2007/0112510 A1 | 5/2007 | Ogawa |
| 2011/0246404 A1 | 10/2011 | Lehmann et al. |
| 2011/0319094 A1 | 12/2011 | Usui et al. |
| 2016/0202074 A1* | 7/2016 | Woodard ............. G06Q 10/047 701/465 |
| 2017/0300814 A1 | 10/2017 | Shaked et al. |
| 2018/0107215 A1* | 4/2018 | Djuric .................... G01C 21/26 |
| 2018/0364054 A1* | 12/2018 | Chen .................... G01C 21/343 |
| 2019/0073547 A1* | 3/2019 | el Kaliouby ....... G06K 9/00845 |

OTHER PUBLICATIONS

Extended European Search Report issued in corresponding European Application No. EP 91 3122, dated Jul. 2, 2019, 9 pages.
Shuai Zhang et al., "Deep Learning based Recommender System: A Survey and New Perspectives", arxiv.org, Cornell University Library, 201 Olin Library Cornell University Ithaca, NY 14853, Jul. 24, 2017 (Jul. 24, 2017), XP081322951, 35 pages.
Shuang Yang et al., "Neural network ensembles: combining multiple models for enhanced performance using a multistage approach", Expert Systems, vol. 21, No. 5, Nov. 1, 2004 (Nov. 1, 20014), pp. 279-288.
Liu Yangdong et al, "Short-term travel time prediction by deep learning: A comparison of different LSTM-DNN models", 2017 IEEE 20th International Conference on Intelligent Transportation Systems (ITSC), IEEE, Oct. 16, 2017 (Oct. 16, 2017), pp. 1-8.
Satu Inamaa, "Short Term Prediction of Travel Time using Neural Networks on an Interurban Highway", Transportation, Kluwer Academic Publishers, DO, vol. 32, No. 6, Nov. 1, 2005 (Nov. 1, 2005), pp. 649-669.
Yanjie Duan et al., "Travel time prediction with LSTM neural network", 2016 IEEE 19th International Conference on Intelligent Transportation Systems (ITSC), IEEE, Nov. 1, 2016 (Nov. 1, 2016), pp. 1053-1058.

* cited by examiner

400

401: Training a machine learning model with a plurality of historical vehicle trips, wherein the machine learning model comprises a wide network, a deep neural network, and a recurrent neural network all coupled to a multiplayer perceptron network

402: Inputting transportation information to a trained machine learning model, wherein the transportation information comprises a origin and a destination associated with the ride order, and the trained machine learning model comprises a wide algorithm, a deep neural network, and a recurrent neural network all coupled to a multiplayer perceptron network

404: Based on the trained machine learning model, obtaining an estimated time for arriving at the destination via a route connecting the origin and the destination

FIG. 4A

SYSTEM AND METHOD FOR ESTIMATING ARRIVAL TIME

CROSS-REFERENCE TO RELATED APPLICATIONS

This application is a continuation application of PCT Patent Application No. PCT/CN2017/112520, filed Nov. 23, 2017 and titled "SYSTEM AND METHOD FOR ESTIMATING ARRIVAL TIME," the entire contents of which are incorporated herein by reference.

TECHNICAL FIELD

This disclosure generally relates to methods and devices for estimating arrival time.

BACKGROUND

A vehicle dispatch platform can allocate transportation requests to various vehicles for respectively providing transportation services. A user who requests such service may indicate an origin and a destination for the platform to determine one or more suitable routes. To help estimate service fee and/or provide information for deciding whether to accept the service, it is important to accurately predict the arrival time at the destination.

SUMMARY

Various embodiments of the present disclosure can include systems, methods, and non-transitory computer readable media configured to estimate arrival time. A method for estimating arrival time associated with a ride order may comprise inputting transportation information to a trained machine learning model. The transportation information may comprise an origin and a destination associated with the ride order. The trained machine learning model may comprise a wide network, a deep neural network, and a recurrent neural network all coupled to a multilayer perceptron network. The method may further comprise, based on the trained machine learning model, obtaining an estimated time for arriving at the destination via a route connecting the origin and the destination.

In some embodiments, the route comprises a sequence of connected links, each link corresponding to a road segment. The transportation information further comprises at least one of: driver identification, passenger identification, day-of-week, time, weather, peak hour determination, a shape encompassing the route, link identification, link speed limit, link toll determination, link road width, link road classification, real-time link traffic speed, link length, or link traffic light duration.

In some embodiments, training the machine learning model comprises, for each of a plurality of historical vehicle trips: obtaining transportation training data associated with the historical vehicle trip, the transportation training data comprising a historical route connecting a historical origin and a historical destination and a real historical trip time; obtaining one or more (1) global features and (2) local features from the transportation training data; inputting the global features to the wide network, inputting the global features to the deep neural network, and inputting the local features to the recurrent neural network to obtain outputs respectively; inputting the outputs from the wide network, the deep neural network, and the recurrent neural network to the multilayer perceptron network to obtain an estimated historical trip time; and updating one or more weights associated with the wide network, the deep neural network, the recurrent neural network, and the multilayer perceptron network at least based on minimizing a difference between the estimated historical trip time and the real historical trip time. The historical route may correspond to a sequence of connected links, each link corresponding to a road segment. The global features may be uniform for the links in the historical route. The local features may be associated with the links individually.

In some embodiments, the global features may comprise (1) sparse features comprising at least one of: driver identification, passenger identification, day-of-week, time, weather, or peak hour determination; and (2) first dense features comprising a shape encompassing the route. The local features may comprise (1) nominal features correspondingly associated with the links, the nominal features comprising at least one of: link identification, link speed limit, link toll determination, link road width, or link road classification; and (2) second dense features correspondingly associated with the links, the second dense features comprising at least one of: real-time link traffic speed, link length, or link traffic light duration.

In some embodiments, inputting the global features to the wide network to obtain the output from the wide network comprises: obtaining a plurality of feature products, each feature product corresponding to a product between every two of the global features; and performing affine transformation based on the global features and the obtained features products to obtain the output from the wide network. The affine transformation may map the global features and the obtained features products to an output, and the global features and the output may be associated with one or more of the weights.

In some embodiments, the deep neural network may comprise a feedforward neural network, the feedforward neural network may comprise a plurality of layers in a sequence, every two of the layers that are next to each other may be associated with one or more of the weights, the plurality of layers may comprise an input layer, one or more hidden layers, and an output layer, and the global features may comprise sparse features and first dense features. Inputting the global features to the deep neural network to obtain the output from the deep neural network may comprise: embedding the sparse features; concatenating the first dense features and the embedded sparse features; and feeding the concatenated first dense features and sparse features to the feedforward neural network to obtain the output from the output layer of the feedforward neural network.

In some embodiments, the recurrent neural network may comprise a plurality of layers in a sequence corresponding the sequence of the links, every two of the layers that are next to each other may be associated with one or more of the weights, and each of the layers other than a first layer may receive an input and a prior hidden state from a prior layer and generate an output and a current hidden state. Inputting the local features to the recurrent neural network to obtain the output from the recurrent neural network may comprise, for each of the historical trips: correspondingly feeding the local features as inputs to the layers to obtain a current hidden state of a last layer in the sequence of layers.

In some embodiments, the recurrent neural network may comprise another multilayer perceptron network coupled to a long short-term memory network, the another multilayer perceptron network and the long short-term memory network each associated with one or more of the weights. Inputting the local features to the recurrent neural network to obtain the output from the recurrent neural network may comprise: feeding the local features to the another multilayer perceptron network to obtain first results correspondingly associated with the links, and feeding the first results correspondingly as inputs to various layers of the long short-term memory network to obtain a current hidden state of a last layer of the various layers.

In some embodiments, the multilayer perceptron network may comprise a plurality of layers in a sequence, every two of the layers that are next to each other may be associated with one or more of the weights, and the plurality of layers may comprise an input layer, one or more hidden layers, and an output layer.

According to another aspect, the present disclosure provides a system for estimating arrival time associated with a ride order. The system may be implementable on a server. The system may comprise a processor and a non-transitory computer-readable storage medium storing instructions that, when executed by the processor, cause the system to perform a method. The method may comprise inputting transportation information to a trained machine learning model. The transportation information may comprise an origin and a destination associated with the ride order. The trained machine learning model may comprise a wide network, a deep neural network, and a recurrent neural network all coupled to a multilayer perceptron network. The method may further comprise, based on the trained machine learning model, obtaining an estimated time for arriving at the destination via a route connecting the origin and the destination.

According to another aspect, the present disclosure provides a method for estimating arrival time associated with a ride order. The method may be implementable on a server. The method may comprise receiving from a device a ride order for transportation from an origin to a destination, determining a route connecting the origin and the destination, obtaining transportation information associated with the route, inputting the obtained transportation information to a trained machine learning model to obtain an estimated time for arriving at the destination via the route, and causing the estimated time to be played on the device.

According to another aspect, the present disclosure provides a system for estimating arrival time associated with a ride order, comprising a processor and a non-transitory computer-readable storage medium storing instructions that, when executed by the processor, cause the system to perform a method. The method may comprise: receiving from a device a ride order for transportation from an origin to a destination; determining a route connecting the origin and the destination; obtaining transportation information associated with the route; inputting the obtained transportation information to a trained machine learning model to obtain an estimated time for arriving at the destination via the route; and causing the estimated time to be played on the device.

According to another aspect, the present disclosure provides a non-transitory computer-readable storage medium storing instructions that, when executed by a processor, cause the processor to perform a method for estimating arrival time associated with a ride order. The method may comprise: receiving from a device a ride order for transportation from an origin to a destination; determining a route connecting the origin and the destination; obtaining transportation information associated with the route; inputting the obtained transportation information to a trained machine learning model to obtain an estimated time for arriving at the destination via the route; and causing the estimated time to be played on the device.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4A illustrates a flowchart of an example method for estimating arrival time, in accordance with various embodiments.

DETAILED DESCRIPTION

Figure 1:
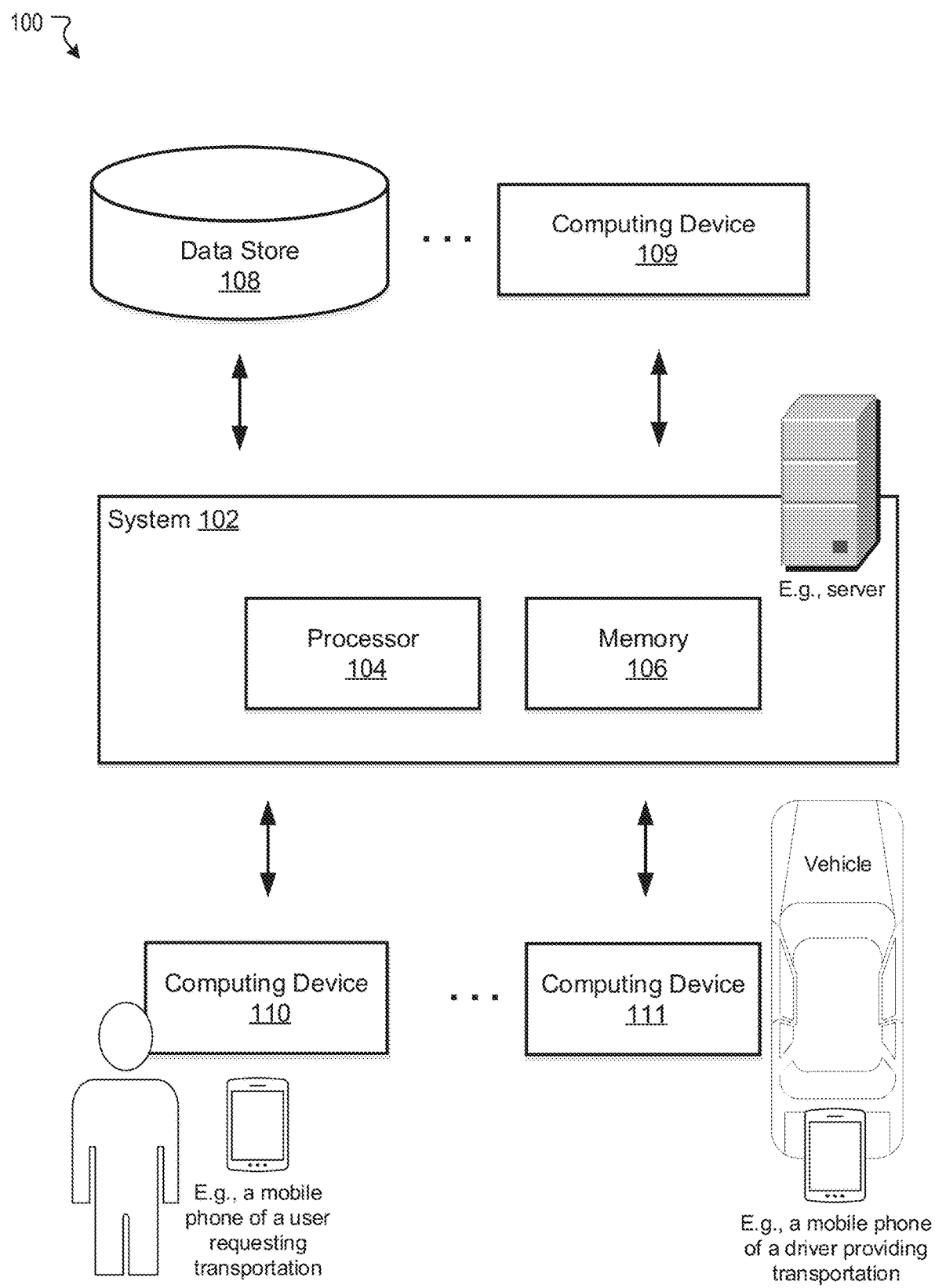
FIG. 1 illustrates an example environment for estimating arrival time, in accordance with various embodiments.

Vehicle platforms may be provided for transportation services. Such vehicle platform may also be referred to as a vehicle hailing or vehicle dispatch platform, accessible through devices such as mobile phones installed with a platform application. Via the application, users (ride requestors) can transmit transportation requests (e.g., a destination, an origin such as an identified pick-up location or a current location of the user) to the vehicle platform. The vehicle platform may determine one or more routes for transportation from the origin to the destination, based on various factors such as least distance, least cost for the users, least cost for the drivers, availability of vehicles, etc. The vehicle platform may also transmit the requests to vehicle drivers via the application, based on various factors such as proximity to the location of the requestor or the pick-up location, etc. The vehicle drivers can choose from the requests, and each can pick one to accept. When the transportation request is matched with a vehicle, the user can be notified via the application of the vehicle platform, the determined route, and/or an estimated time of arrival. The estimated time of arrival is important for the vehicle platform to determine the charge for the transportation service and for the user to determine whether to accept the transportation service. Further, the arrival time can be updated in real time while the user is transported by the vehicle to help the user adjust the schedule.

In current technologies, the arrival time estimation method is rudimentary, and its accuracy is low. An exemplary existing method only comprises a physics model, where the travel time is computed based on the total distance and travel speed. The travel speed, subject to many different factors, can vary from one road segment to another in the same route. The lack of consideration of such variation is at least one reason that causes inaccuracy in the existing method.

The disclosed systems and methods can at least overcome the above-described disadvantages in current technologies and provide an accurate arrival time estimation. Although described with reference to a vehicle dispatch scenario, the disclosed systems and methods are applicable in various similar situations for estimating arrival time of a vehicle. The disclosed systems and methods can train a machine learning model based on historical data such as historical trips to obtain a trained machine learning model, which can communicate with the users' and drivers' devices in real time to provide the estimation.

The machine learning model (or algorithm) used by the disclosed systems and methods may comprise a wide network, a deep neural network (DNN), and a recurrent neural network (RNN), all coupled to a multilayer perceptron (MLP) network. Each of the four networks may comprise various weights associating its input(s), intermediate state(s), and output(s). In an example training process, training data may comprise various trips and associated information such as origin, destination, time, location, travel time, etc. Various features can be obtained from the training data and be correspondingly inputted to the wide network, the DNN, and the RNN. Outputs from the wide network, the DNN, and the RNN can be combined or otherwise inputted to the MLP to obtain an estimated arrival time for each trip in the training data. The weights associated with the wide network, the DNN, the RNN, and the MLP can be updated based at least on minimizing a difference between the estimated arrival time and the (historical) travel time. Thus, by training the machine learning model with many historical trips, a trained machine learning model reaching a threshold accuracy can be obtained.

Various embodiments of the present disclosure include systems, methods, and non-transitory computer readable media configured to estimate arrival time. In some embodiments, a method for estimating arrival time associated with a ride order may be implementable on a server, and may comprise receiving from a device a ride order for transportation from an origin to a destination, determining a route connecting the origin and the destination, obtaining transportation information associated with the route, inputting the obtained transportation information to a trained machine learning model to obtain an estimated time for arriving at the destination via the route, and causing the estimated time to be played on the device.

In some embodiments, the route may comprise a sequence of connected links, each link corresponding to a road segment. The transportation information may comprise at least one of: driver identification, passenger identification, day-of-week, time, weather, peak hour determination, a shape encompassing the route, link identification, link speed limit, link toll determination, link road width, link road classification, real-time link traffic speed, link length, or link traffic light duration.

In some embodiments, a method for estimating arrival time associated with a ride order may comprise inputting transportation information to a trained machine learning model. The transportation information comprises an origin and a destination associated with the ride order, and the trained machine learning model comprises a wide network, a deep neural network, and a recurrent neural network all coupled to a multilayer perceptron network. The method may further comprise, based on the trained machine learning model, obtaining an estimated time for arriving at the destination via a route connecting the origin and the destination. The method may be performed by a computing device such as a server, a mobile phone, etc.

FIG. 1 illustrates an example environment 100 for estimating arrival time, in accordance with various embodiments. As shown in FIG. 1, the example environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The system 102 may be implemented on or as various devices such as mobile phone, tablet, server, computer, wearable device (smart watch), etc. The system 102 above may be installed with appropriate software (e.g., platform program, etc.) and/or hardware (e.g., wires, wireless connections, etc.) to access other devices of the environment 100.

The environment 100 may include one or more data stores (e.g., a data store 108) and one or more computing devices (e.g., a computing device 109) that are accessible to the system 102. In some embodiments, the system 102 may be configured to obtain data (e.g., as origin, destination, time, location, travel time, and other data for past vehicle transportation trips) from the data store 108 (e.g., a database or dataset of historical transportation trips) and/or the computing device 109 (e.g., a computer, a server, a mobile phone used by a driver or passenger that captures transportation trip information). The system 102 may use the obtained data to train a machine learning model for estimating arrival time. The origin, destination, and other location information may comprise GPS (Global Positioning System) coordinates.

The environment 100 may further include one or more computing devices (e.g., computing devices 110 and 111) coupled to the system 102. The computing devices 110 and 111 may comprise devices such as cellphone, tablet, computer, wearable device (smart watch), etc. The computing devices 110 and 111 may transmit or receive data to or from the system 102.

In some embodiments, the system 102 may implement an online information or service platform. The service may be associated with vehicles (e.g., cars, bikes, boats, airplanes, etc.), and the platform may be referred to as a vehicle (service hailing or ride order dispatch) platform. The platform may accept requests for transportation, match vehicles to fulfill the requests, arrange for pick-ups, and process transactions. For example, a user may use the computing device 110 (e.g., a mobile phone installed with a software application associated with the platform) to request transportation from the platform. The system 102 may receive the request and transmit it to various vehicle drivers (e.g., by posting the request to mobile phones carried by the drivers). A vehicle driver may use the computing device 111 (e.g., another mobile phone installed with the application associated with the platform) to accept the posted transportation request and obtain pick-up location information. Fees (e.g., transportation fees) can be transacted among the system 102 and the computing devices 110 and 111. Some platform data may be stored in the memory 106 or retrievable from the data store 108 and/or the computing devices 109, 110, and 111. For example, for each trip, the location of the origin and destination (e.g., transmitted by the computing device 111), the fee, and the trip time can be obtained by the system 102. Such trip data can be incorporated into training data.

In some embodiments, the system 102 and the one or more of the computing devices (e.g., the computing device 109) may be integrated in a single device or system. Alternatively, the system 102 and the one or more computing devices may operate as separate devices. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. Although the system 102 and the computing device 109 are shown as single components in this figure, it is appreciated that the system 102 and the computing device 109 can be implemented as single devices or multiple devices coupled together. The system 102 may be implemented as a single system or multiple systems coupled to each other. In general, the system 102, the computing device 109, the data store 108, and the computing device 110 and 111 may be able to communicate with one another through one or more wired or wireless networks (e.g., the Internet) through which data can be communicated. Various aspects of the environment 100 are described below in reference to FIG. 2 to FIG. 5.

Figure 2:
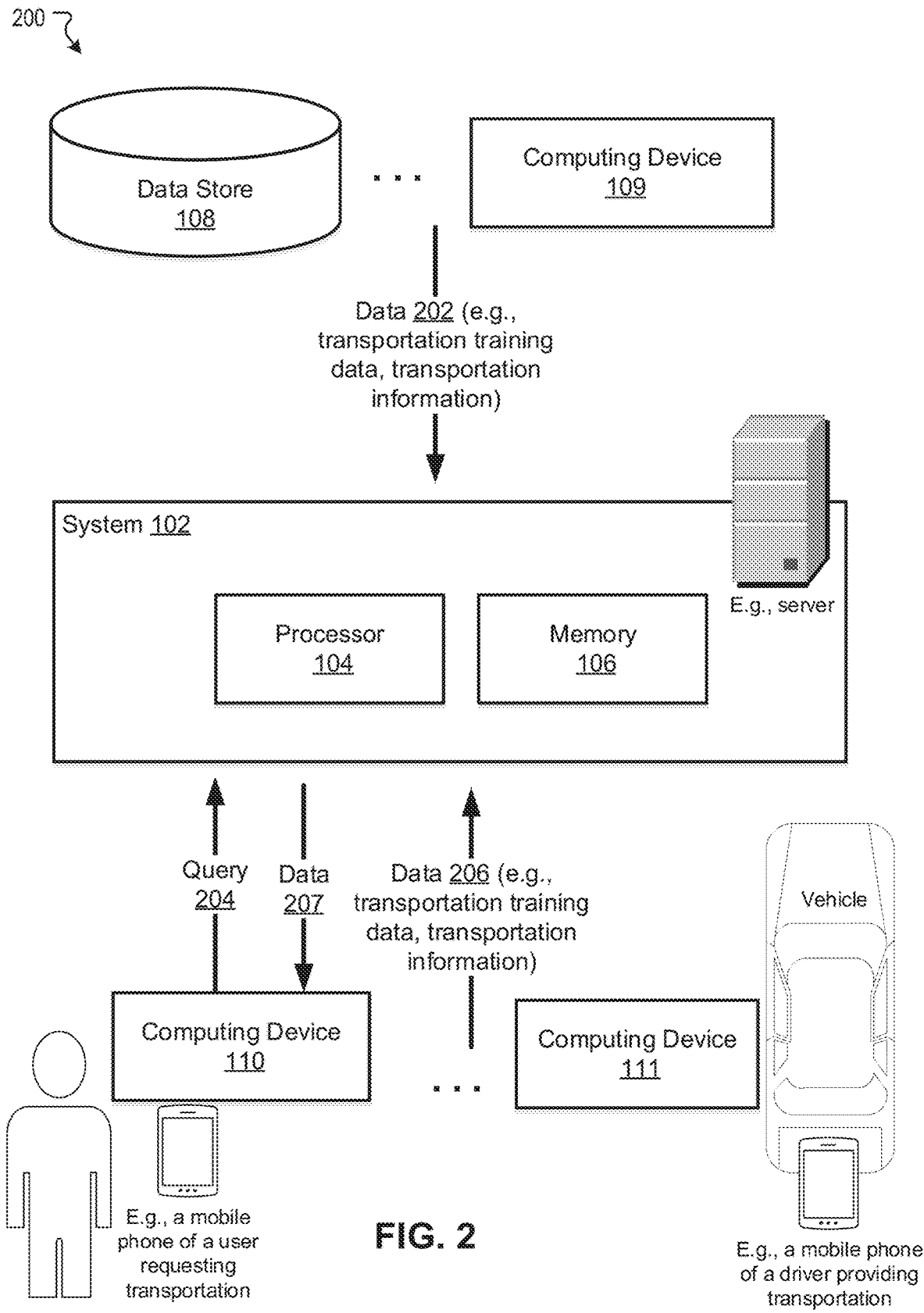
FIG. 2 illustrates an example system for estimating arrival time, in accordance with various embodiments.

FIG. 2 illustrates an example system 200 for dispatching ride order, in accordance with various embodiments. The operations shown in FIG. 2 and presented below are intended to be illustrative.

In various embodiments, the system 102 may obtain data 202 and/or date 206 from the data store 108 and/or the computing devices 109, 110, and 111. The computing device 111 may be associated with (e.g., used by) a driver of a service vehicle including, for example, taxis, service-hailing vehicle, etc. The computing device 110 may be associated with (e.g., used by) a user requesting the vehicle service. The data 202 and the data 206 may comprise training data for training a machine learning model and/or computation data for estimating the arrival time when applying the trained machine learning model. For example, the training data and the computation data may comprise trip-dependent information (e.g., origin, destination) and/or trip-independent information (e.g., road width, road classification). The training data may be collected in advance to train a machine model, and the computation data may be obtained in real-time or in response to a query 204. Some of the computing devices may include various sensors to record data for the training or computation. For example, a GPS (global positioning system) can record the real time location of the vehicle. The GPS or a speedometer in conjunction with a clock can record a vehicle speed with respect to location and time. Further details of the training data are described below with reference to FIG. 4A. The obtained data 202 and/or 206 may be stored in the memory 106. The system 102 may train a machine learning model with the obtained data 202 and/or data 206 (training data) for estimating arrival time.

In some embodiments, a user contemplating placing a ride order may use the computing device 110 to transmit a query 204 to the system 102. The query 204 may be knowingly or unknowingly transmitted from the computing device 110. The query 204 may comprise a request for estimating an arrival time. Alternatively, the computing device 110 may be associated with a user who is requesting or has requested a vehicle service. That is, the user may have or have not accepted a vehicle service. In the former situation, the query 204 may further comprise information such as an origin (e.g., a pick-up location), a destination, etc. Accordingly, the system 102 may apply a trained machine learning model to estimate the arrival time and send data 207 to the computing device 110 or one or more other devices such as the computing device 111. The data 207 may comprise the estimated time for arriving at the destination. If the user has not accepted the vehicle service, the user may put forth or cancel the vehicle service based on the estimated arrival time. If the user has already accepted the vehicle service (e.g., when riding with the vehicle), the user may adjust schedule based on the estimated arrival time. Since the estimated arrival time may be associated with a planned route, the vehicle driver may adjust the planned route based on the estimated arrival time. For example, if the estimated arrival time is updated in real time and surges for reasons such as an accident on the planned route, the driver can accordingly switch an alternative route. If the system 102 determines that a current travel route diverges from the originally planned route (e.g., based on real-time location tracking of the vehicle), the system 102 may update the planned route and update the estimated travel time accordingly.

The arrival time estimation may be triggered by a computing device such as a server, a mobile phone, etc. In various embodiments, a method for estimating arrival time associated with a ride order may comprise inputting transportation information to a trained machine learning model. The transportation information may comprise an origin (e.g., a pick-up location) and a destination associated with the ride order (that is, transportation from the origin to the destination). The method may further comprise, based on the trained machine learning model, obtaining an estimated time for arriving at the destination via a route connecting the origin and the destination. The route may comprise a sequence of connected links, each link corresponding to a road segment. A street may comprise many links (road segments) depending on various factors such as road classification, speed limit, street lights, etc. In some embodiments, a link terminal can be determined at a location where one or more of these factors change. The transportation information may further comprise at least one of: driver identification, passenger identification, day-of-week, time, weather, peak hour determination, a shape encompassing the route, link identification, link speed limit, link toll determination, link road width, link road classification, real-time link traffic speed, link length, or link traffic light duration. The trained machine learning model may comprise a wide network, a deep neural network, and a recurrent neural network all coupled to a multilayer perceptron network as described below with reference to FIGS. 3A-3C.

Figure 3A:
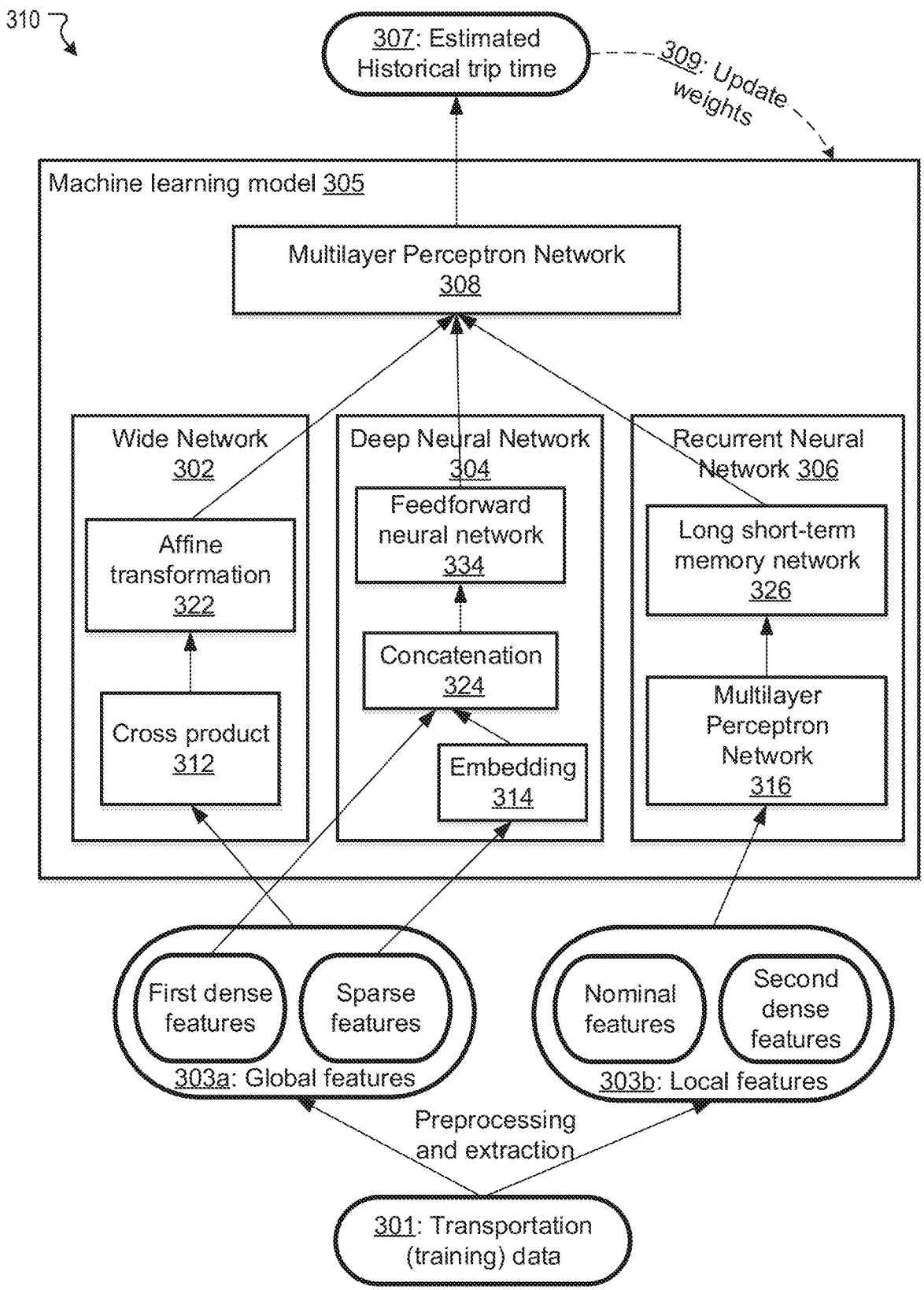
FIG. 3A illustrates an example machine learning model for estimating arrival time, in accordance with various embodiments.

FIG. 3A illustrates an example machine learning model 305 for estimating arrival time and its training process 310, in accordance with various embodiments. The operations shown in FIG. 3A and presented below are intended to be illustrative. The machine learning model 305 may comprise a wide network 302, a deep neural network 304, and a recurrent neural network 306, all coupled to a multilayer perceptron network 308.

In some embodiments, the training may be performed based on each of a plurality of historical vehicle trips. Training the machine learning model may comprise: (step 301) obtaining transportation training data associated with the historical vehicle trip, the transportation training data comprising a historical route connecting a historical origin and a historical destination and a real historical trip time; (step 303a and 303b) obtaining one or more global features and local features from the transportation training data; inputting the global features to the wide network 302, inputting the global features to the deep neural network 304, and inputting the local features to the recurrent neural network 306 to obtain outputs respectively; inputting the outputs from the wide network, the deep neural network, and the recurrent neural network to the multilayer perceptron network 308 to obtain an estimated historical trip time (at step 307); and (step 309) updating one or more weights associated with the wide network, the deep neural network, the recurrent neural network, and the multilayer perceptron network at least based on minimizing a difference between the estimated historical trip time and the real historical trip time.

In some embodiments, the transportation training data may be obtained from various systems, devices (e.g., sensors on mobile phones), data stores (e.g., online map data store), etc. For example, the transportation training data may include map data, road data, ride order data, etc. The transportation data may be preprocessed. For example, various thresholding and filtering techniques can be used to remove noise from the raw data.

In some embodiments, the global features and local features may be obtained from the transportation data. The global features may comprise sparse features and first dense features. The local features (or alternatively referred to as sequential features) may comprise nominal features and second dense features. In some cases, sparse features as a data represent representation contain a large percentage of zeros, as opposed to dense features. Further, in an example, the transportation training data may correspond to various historical trips. Each historical trip may be associated with a historical route, via which a past transportation had been performed from a historical origin to a historical destination. The historical route may correspond to a sequence of connected links, each link corresponding to a road segment. The global features may be uniform for the links in the historical route, and the local features may be associated with the links individually (that is, may differ from link to link). A street may be divided into one or more links. In some cases, a street light or cross-section divides two or more neighboring links.

Referring but not limited to the global features, in some embodiments, the sparse features may comprise at least one of: driver identification (e.g., driver ID stored in a database in the system 102, the database also storing other information associated with the driver ID), passenger identification (e.g., passenger ID stored similarly to the driver ID), day-of-week, time (e.g., a timestamp, a time slice when a day is divided into equal time slices such as 5 minutes), weather (e.g., weather during the trip), or peak hour determination (e.g., whether the past trip overlaps with a predetermined peak traffic hour). The first dense features (or alternatively referred to as first real number features) may comprise a shape (e.g., a smallest square) encompassing the route.

Referring but not limited to the local features, in some embodiments, the nominal features correspondingly associated with the links may comprise at least one of: link identification (e.g., link ID stored in a database in the system 102, the database also storing other information associated with the link ID), link speed limit (e.g., a vehicle speed limit on each road segment), link toll determination (e.g., whether each road segment is has a toll), link road width, or link road classification (e.g., highway classification, local road classification). The second dense features (or alternatively referred to as second real number features) correspondingly associated with the links may comprise at least one of: real-time link traffic speed (e.g., the speed of traffic flow on each road segment in real time), link length, or link traffic light duration (e.g., how long a red or green light of a street light in each road segment lasts).

Each of the global and local features may affect the arrival time. For example, inclement weather and toll booth may slow the travel speed and delay the arrival time. For another example, link speed limit may set a theoretical upper limit of the travel speed via that link. For yet another example, the smallest square encompassing the route may be associated with coordinate locations of its two opposite corners, which can be used to determine if two squares are close-by. If two squares are close-by geographically, the corresponding routes can be determined in the same area and to share some similarities in the estimated arrival time.

Referring but not limited to the wide network 302, in some embodiments, inputting the global features (the sparse features and the first dense features) to the wide network to obtain the output from the wide network may comprise: (step 312) obtaining a plurality of feature products, each feature product corresponding to a product (e.g., cross) between every two of the global features; and (step 322) performing affine transformation based on the global features and the obtained features products to obtain the output from the wide network. The affine transformation maps the global features and the obtained features products to an output, and the global features (inputs) and the output are associated with one or more weights. For example, if two global features are x and y, their product xy can be the feature product, and the affine transformation can be performed on (x, y, xy) to obtain $w_1 x + w_1 y + w_3 xy + b$, where $w_1$, $w_2$, and $w_3$ are linear transformations on x, y, and xy, and b is a vector in the transformed space. The weights may comprise $w_1$, $w_2$, $w_3$, and/or b.

Figure 3B:
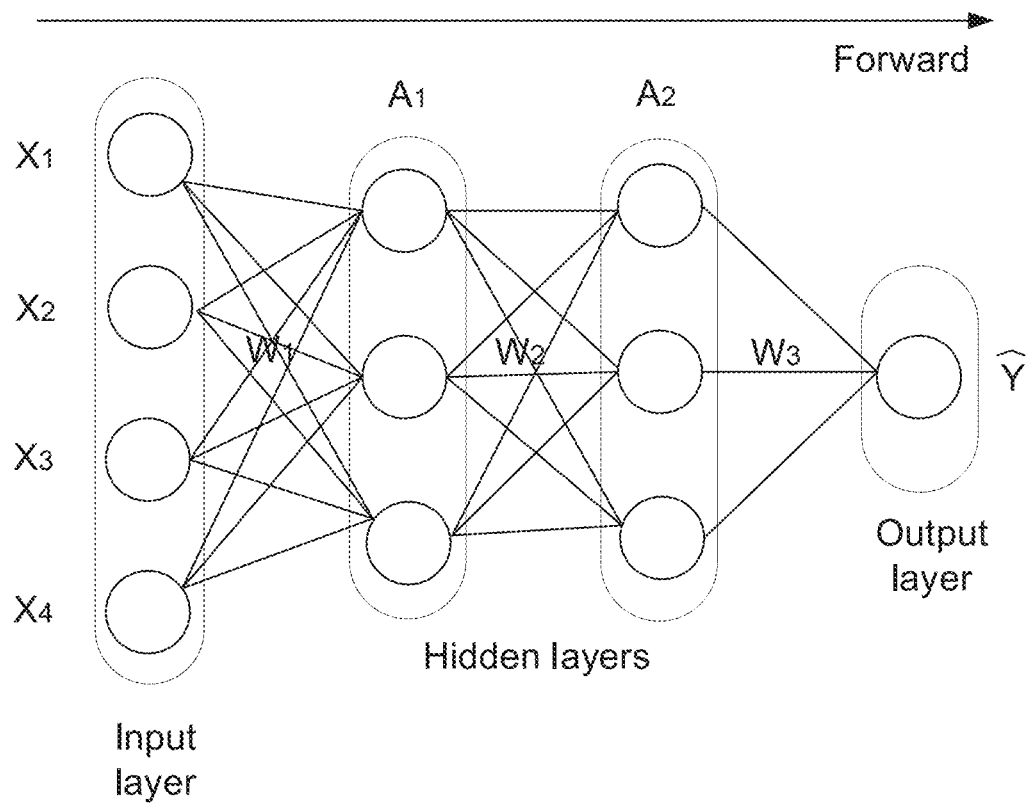
FIG. 3B illustrates an example multilayer perceptron framework for estimating arrival time, in accordance with various embodiments.

Referring but not limited to the deep neural network 304, in some embodiments, the deep neural network may comprise a feedforward neural network (FNN). A multilayer perceptron (MLP) network described below with reference to FIG. 3B is an example of FNN. The feedforward neural network may comprise a plurality of layers in a sequence. The plurality of layers comprises an input layer, one or more hidden layers, and an output layer. Every two of the layers that are next to each other may be associated with one or more weights. The global features may comprise sparse features and first dense features. Inputting the global features to the deep neural network to obtain the output from the deep neural network may comprise: (step 314) embedding the sparse features (e.g., applying a sigmoid function, applying local linear embedding), (step 324) concatenating the first dense features and the embedded sparse features (e.g., combining the features); and (step 334) feeding the concatenated the first dense features and the sparse features to the feedforward neural network to obtain the output from the output layer of the feedforward neural network.

Referring but not limited to the recurrent neural network 306, in some embodiments, the recurrent neural network may comprise a plurality of layers in a sequence corresponding the sequence of the links. Every two of the layers that are next to each other may be associated with one or more of the weights. Each of the layers other than a first layer may receive an input and a prior hidden state from a prior layer and generate an output and a current hidden state. Inputting the local features (the nominal features and the second dense features) to the recurrent neural network to obtain the output from the recurrent neural network may comprise, for each of the historical trips, correspondingly feeding the local features as inputs to the layers to obtain a current hidden state of a last layer in the sequence of layers. An exemplary recurrent neural network is described below with reference to FIG. 3C.

Alternatively, the recurrent neural network comprises a multilayer perceptron (MLP) network coupled to a long short-term memory network (LSTM), the another multilayer perceptron network and the long short-term memory network each associated with one or more of the weights. For example, the MLP and the LSTM may comprise one or more weights associating the input and the output of the recurrent neural network 306. In some embodiments, inputting the local features to the recurrent neural network to obtain the output from the recurrent neural network may comprise: (step 316) feeding the local features to the another multilayer perceptron network to obtain first results correspondingly associated with the links; and (step 326) feeding the first results correspondingly as inputs to various layers of the long short-term memory network to obtain a current hidden state of a last layer of the various layers.

Referring but not limited to the multilayer perceptron network 308, in some embodiments, the multilayer perceptron network may comprise a plurality of layers in a sequence. The plurality of layers comprises an input layer, one or more hidden layers, and an output layer. Every two of the layers that are next to each other are associated with one or more weights. The input layer may comprise an output from the wide network 302, an output from the deep neural network 304, and an output from the recurrent neural network 306 (e.g., a hidden state). An exemplary multilayer perceptron network is described below with reference to FIG. 3B.

In some embodiments, at step 307, an estimated historical trip time may be outputted from the multilayer perceptron network 308. At step 309, as described above, the weights associated with the machine learning model 305 (that is, the weights associated with the wide network 302, the deep neural network 304, and the recurrent neural network 306, and the multilayer perceptron network 308) may be updated at least based on minimizing a difference between the estimated historical trip time from the step 307 and the real historical trip time from historical data. The historical trip time may be independently verified, manually obtained, cross-checked, or otherwise kept accurate. In one example, an error between the estimated historical trip time and the real historical trip time can be computed by using a loss function. This error can then be propagated back through the machine learning model 305, for example, using a back-propagation algorithm, to update the weights for each layer according to stochastic gradient descent, one layer at a time. This can be called backward pass.

In some embodiments, at the conclusion of the training, the weights may have been trained such that the accuracy of the estimated arrival time is above a threshold. The accuracy can be verified using by historical trip data. In some embodiments, when applying the trained machine learning model to estimate arrival time on-demand, transportation data can be fed to the model similar to the transportation training data described above. The transportation data may comprise information such as origin and destination. Other data such as the various features described above may be included in the transportation data or be fetched from other sources such as online data stores, cloud devices.

FIG. 3B illustrates an example multilayer perceptron framework for estimating arrival time, in accordance with various embodiments. The operations shown in FIG. 3B and presented below are intended to be illustrative.

In a neural network such as multilayer perceptron network, neurons may serve as the basic building block. A neuron may receive an input signal (e.g., input data), process it using a logistic computation function, and transmit an output signal (e.g., output data) depending on the computation outcome. When these neurons are arranged into networks of neurons, they are termed as neural networks. Each column of neurons in the network is called a layer, and a network can have multiple layers with multiple neurons in each layer. Network with single neuron is called perceptron and network with multiple layers of neurons is called multi-layer perceptron (MLP). For example, a two hidden layer MLPs (layer $A_1$ and layer $A_2$) are shown in FIG. 3B, where the input layer comprises the inputs ($X_1, X_2, X_3, X_4$) to the network. The input layer is also called the visible layer because this may be the only exposed part of the network. Hidden layers derive features from the input layer at different scales or resolutions to form high-level features and output a value or a vector of values at the output layer. At each hidden layer, the network may compute the features as:

$$A_1 = f(W_1 * X)$$

$$A_2 = f(W_2 * A_1)$$

$$\hat{Y} = f(W_3 * A_2)$$

Where, f is the function which takes the combination of weights (e.g., $W_1, W_2, W_3$) and outputs at the previous layer and outputs a value. Function f can be identical for all the hidden layers or can be different. A1, A2, and $\hat{Y}$ are the successive outputs of first hidden layer, second hidden layer, and the final output layer. For a given row of data X as an input to network, the network may process the input to obtain A1, A2 and finally obtain the predicted output $\hat{Y}$. This can be called forward pass, and the network can be called a feedforward network.

Figure 3C:
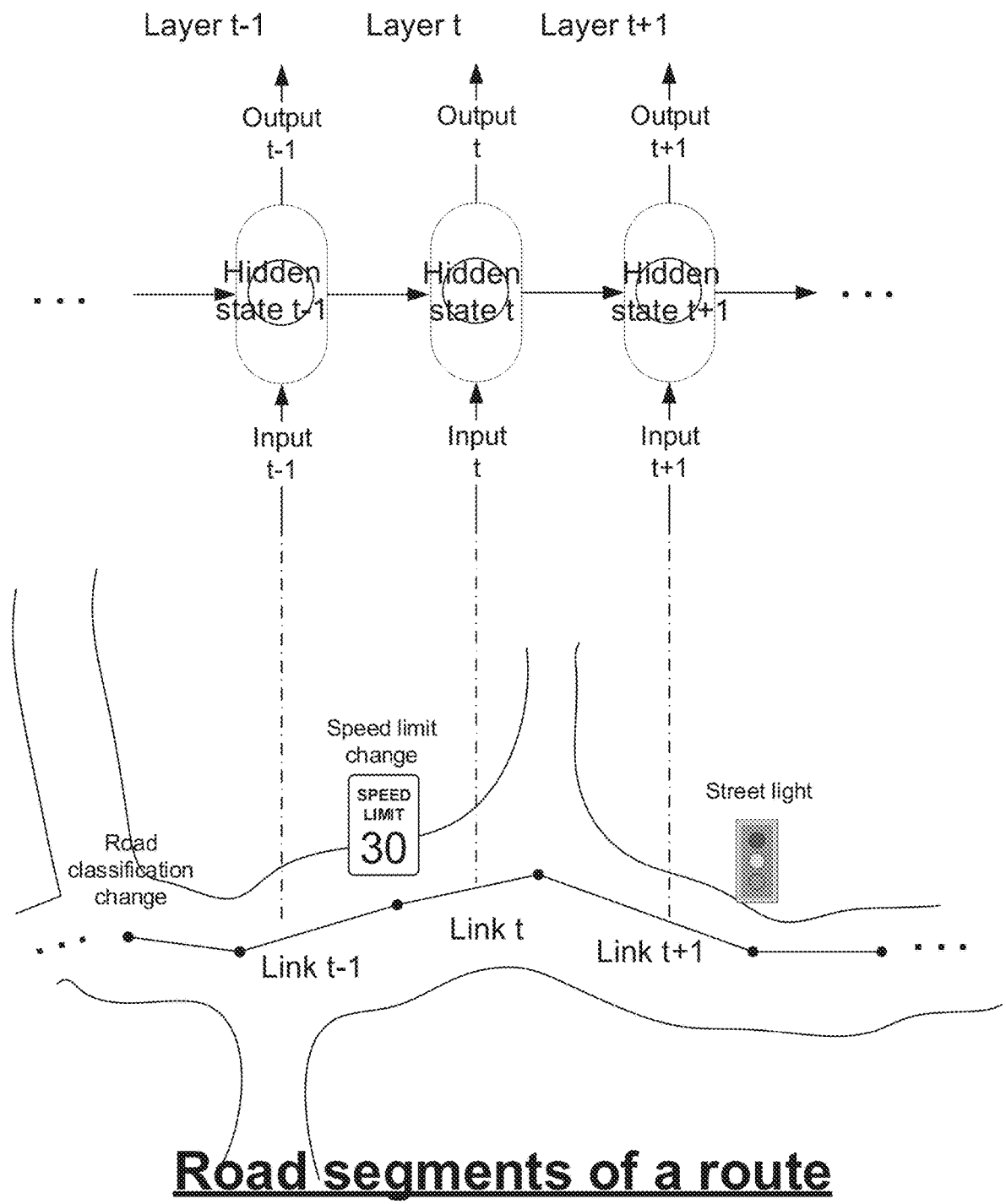
FIG. 3C illustrates an example recurrent neural network framework for estimating arrival time, in accordance with various embodiments.

FIG. 3C illustrates an example recurrent neural network (RNN) framework for estimating arrival time, in accordance with various embodiments. The operations shown in FIG. 3C and presented below are intended to be illustrative.

Since the route can be divided into the links, and as the vehicle presumably travel from the origin to the destination via the links, the links can be sequential with respect to each other. The recurrent neural network can make use of sequential information to estimate the arrival time. That is, the inputs (and outputs) may depend on each other. RNNs are called recurrent because they perform the same task for every element of a sequence, with the output being depended on the previous computations. RNNs can make use of information in arbitrarily long sequences, for example, information a few steps back.

FIG. 3C shows a portion (layer t−1, layer t, layer t+1) of a RNN. The layer t−1 corresponds to link t−1 of the route, the layer t corresponds to link t of the route, and the layer t+1 corresponds to link t+1 of the route. Each layer (other than the first layer) may receive an input and a hidden state from a previous layer. For example, for layer t, it receives input t and hidden state t−1. The input may be expressed in a vector. The hidden state may be referred to as a "memory" of the network. The hidden state t may be obtained based on, for example, a nonlinear function of the input t and the hidden state t−1 each associated with a weight. The output t may be a function of the hidden state t associated with a weight.

As shown above, the disclosed systems and methods can significantly improve the accuracy of the arrival time estimation. The wide network and the deep neural network can model the overall features of the route. For example, by cross-product, sparse features can be modeled with high accuracy. Further, the RNN can model features of the various links and their differences in the arrival time estimation. Therefore, the disclosed systems and methods significantly improve over existing technologies.

FIG. 4A illustrates a flowchart of an example method 400, according to various embodiments of the present disclosure. The method 400 may be implemented in various environments including, for example, the environment 100 of FIG. 1. The example method 400 may be implemented by one or more components of the system 102 (e.g., the processor 104, the memory 106), the computing device 110 (e.g., a mobile phone associated with a user), or the computing device 111 (e.g., a mobile phone associated with a vehicle driver). The example method 400 may be implemented by multiple systems similar to the system 102. The operations of method 400 presented below are intended to be illustrative. Depending on the implementation, the example method 400 may include additional, fewer, or alternative steps performed in various orders or in parallel.

At block 401, a machine learning model may be trained with a plurality of historical vehicle trips. The machine learning model may include a wide network, a deep neural network, and a recurrent neural network all coupled to a multilayer perceptron network. Training the machine learning model may comprise performing one or more steps described below with reference to FIG. 4B for each of the historical vehicle trips. At block 402, transportation information may be input to a trained machine learning model. The transportation information may comprise a origin and a destination associated with the ride order, and the trained machine learning model comprises a wide algorithm, a deep neural network, and a recurrent neural network all coupled to a multilayer perceptron network. At block 404, based on the trained machine learning model, an estimated time for arriving at the destination via a route connecting the origin and the destination may be obtained.

Figure 4B:
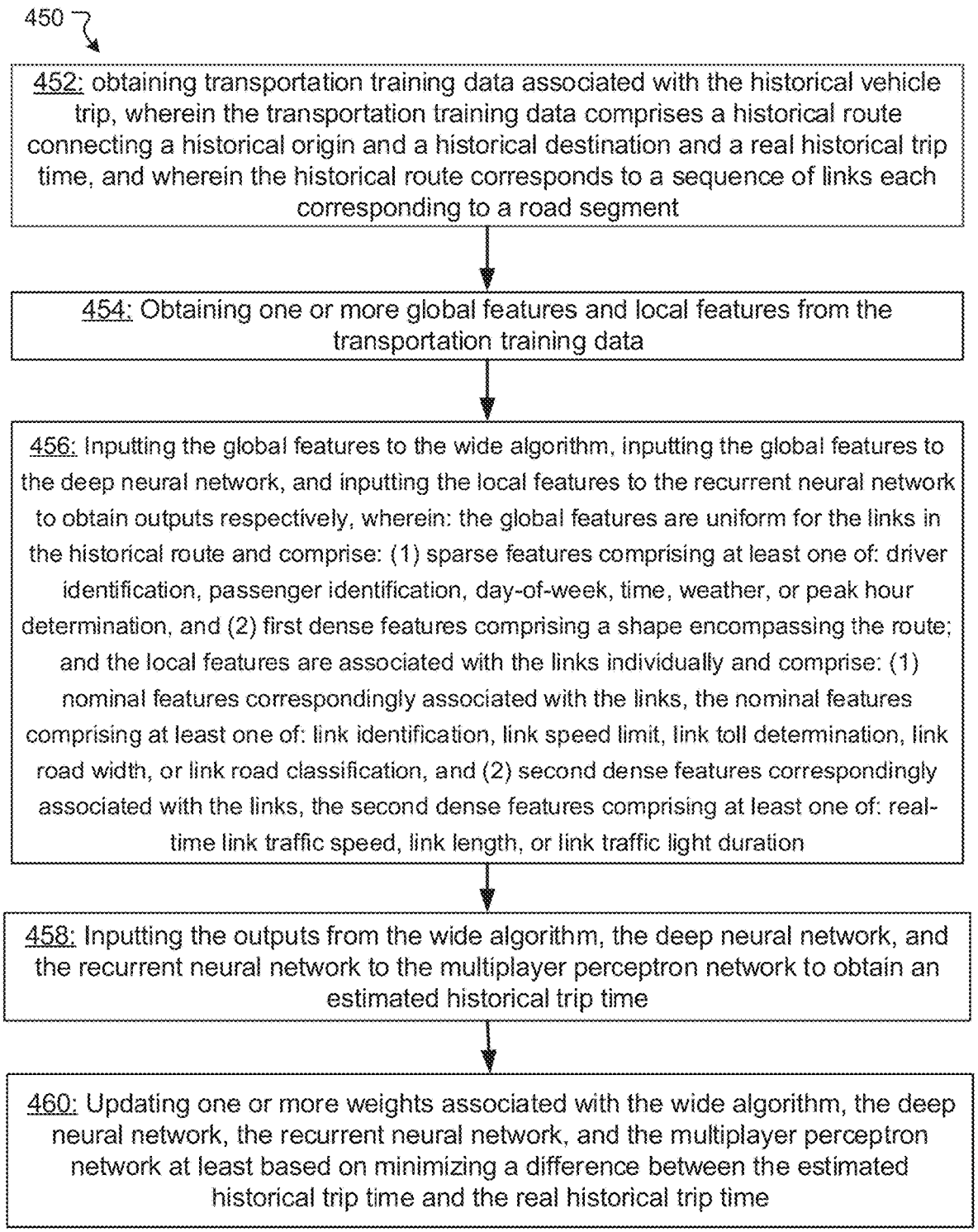
FIG. 4B illustrates a flowchart of an example method for estimating arrival time, in accordance with various embodiments.

FIG. 4B illustrates a flowchart of an example method 450, according to various embodiments of the present disclosure. The method 450 may be implemented in various environments including, for example, the environment 100 of FIG. 1. The example method 450 may be implemented by one or more components of the system 102 (e.g., the processor 104, the memory 106). The example method 450 may be implemented by multiple systems similar to the system 102. The operations of method 450 presented below are intended to be illustrative. Depending on the implementation, the example method 450 may include additional, fewer, or alternative steps performed in various orders or in parallel. Various modules described below may have been trained, e.g., by the methods discussed above.

At block 452, transportation training data associated with the historical vehicle trip may be obtained. The transportation training data may comprise (1) a historical route connecting a historical origin and a historical destination and (2) a real historical trip time. The historical route may correspond to a sequence of links each corresponding to a road segment. At block 454, one or more global features and local features may be obtained from the transportation training data. At block 456, the global features may be input to the wide algorithm, the global features may be input to the deep neural network, and the local features may be input to the recurrent neural network to obtain outputs respectively. The global features may be uniform for the links in the historical route and may comprise: (1) sparse features comprising at least one of: driver identification, passenger identification, day-of-week, time, weather, or peak hour determination, and (2) first dense features comprising a shape encompassing the route. The local features may be associated with the links individually and may comprise: (1) nominal features correspondingly associated with the links, the nominal features comprising at least one of: link identification, link speed limit, link toll determination, link road width, or link road classification, and (2) second dense features correspondingly associated with the links, the second dense features comprising at least one of: real-time link traffic speed, link length, or link traffic light duration. At block 458, the outputs from the wide algorithm, the deep neural network, and the recurrent neural network may be input to the multilayer perceptron network to obtain an estimated historical trip time. At block 460, one or more weights associated with the wide algorithm, the deep neural network, the recurrent neural network, and the multilayer perceptron network may be updated at least based on minimizing a difference between the estimated historical trip time and the real historical trip time. The historical route may correspond to a sequence of connected links, each link corresponding to a road segment. The global features may be uniform for the links in the historical route, and the local features may be associated with the links individually (that is, may differ from link to link).

Figure 4C:
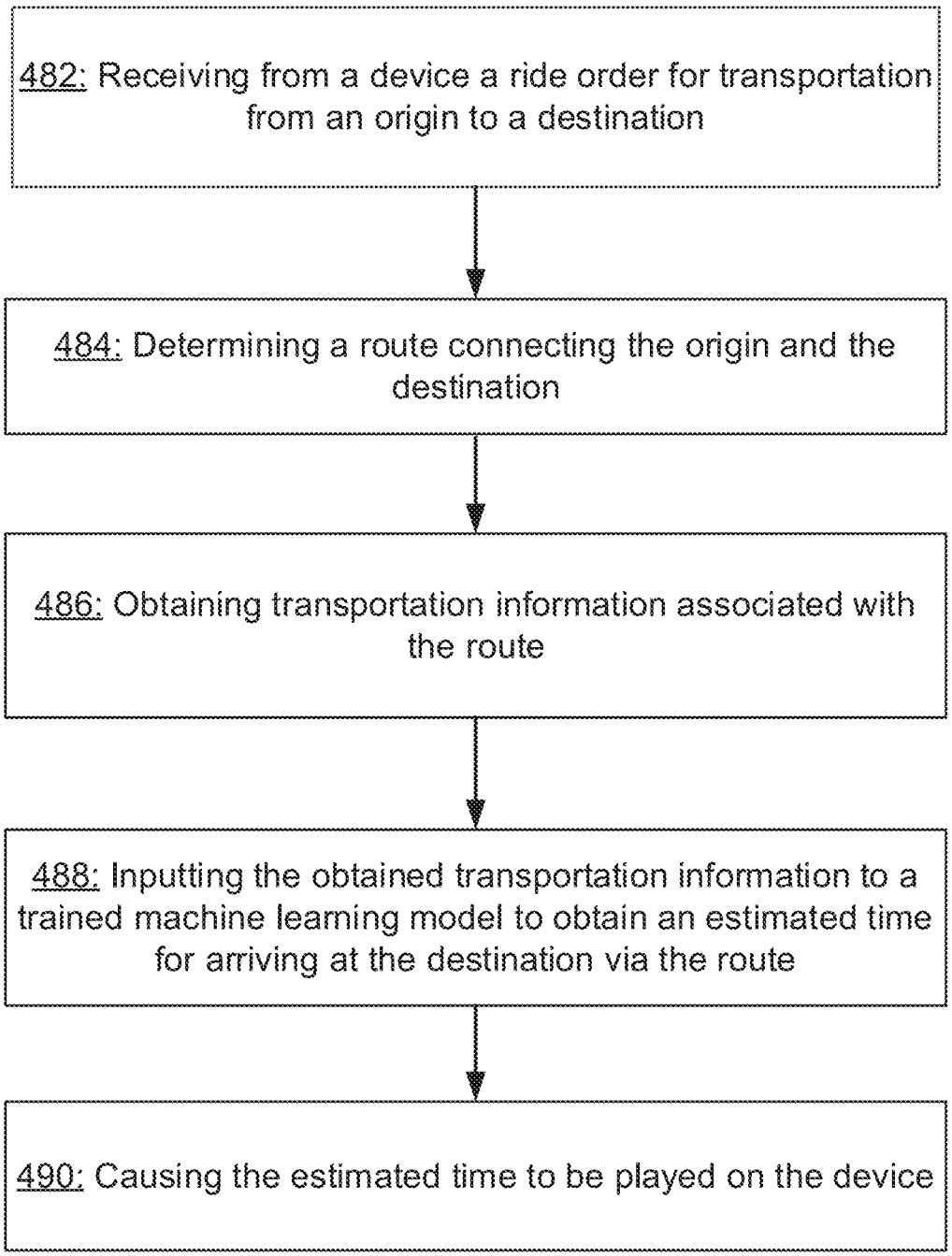
FIG. 4C illustrates a flowchart of an example method for estimating arrival time, in accordance with various embodiments.

FIG. 4C illustrates a flowchart of an example method 480, according to various embodiments of the present disclosure. The method 480 may be implemented in various environments including, for example, the environment 100 of FIG. 1. The example method 480 may be implemented by one or more components of the system 102 (e.g., the processor 104, the memory 106). The example method 480 may be implemented by multiple systems similar to the system 102. The operations of method 480 presented below are intended to be illustrative. Depending on the implementation, the example method 480 may include additional, fewer, or alternative steps performed in various orders or in parallel. Various modules described below may have been trained, e.g., by the methods discussed above.

At block 482, a ride order for transportation from an origin to a destination may be received from a device (e.g., a computing device such as a mobile phone). At block 484, a route connecting the origin and the destination may be determined. For example, a route of shortest distance or a most travelled route connecting the origin and distance can be determined. At block 486, transportation information associated with the route may be obtained. At block 488, the obtained transportation information may be input to a trained machine learning model to obtain an estimated time for arriving at the destination via the route. At block 490, the estimated time may be caused to play on the device (e.g., displayed on a screen, played as a voice).

Alternatively, a ride order for transportation from an origin to a destination may be received from a device (e.g., a computing device such as a mobile phone). One or more routes connecting the origin and the destination may be determined. Transportation information associated with the routes may be obtained and inputted to a trained machine learning model to obtain various trip durations (different estimated time) for arriving at the destination via the routes. One or more of the routes, such as the fastest route, may be determined and caused to display on the device along with the corresponding estimated arrival time (e.g., displayed on a screen, played as a voice).

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
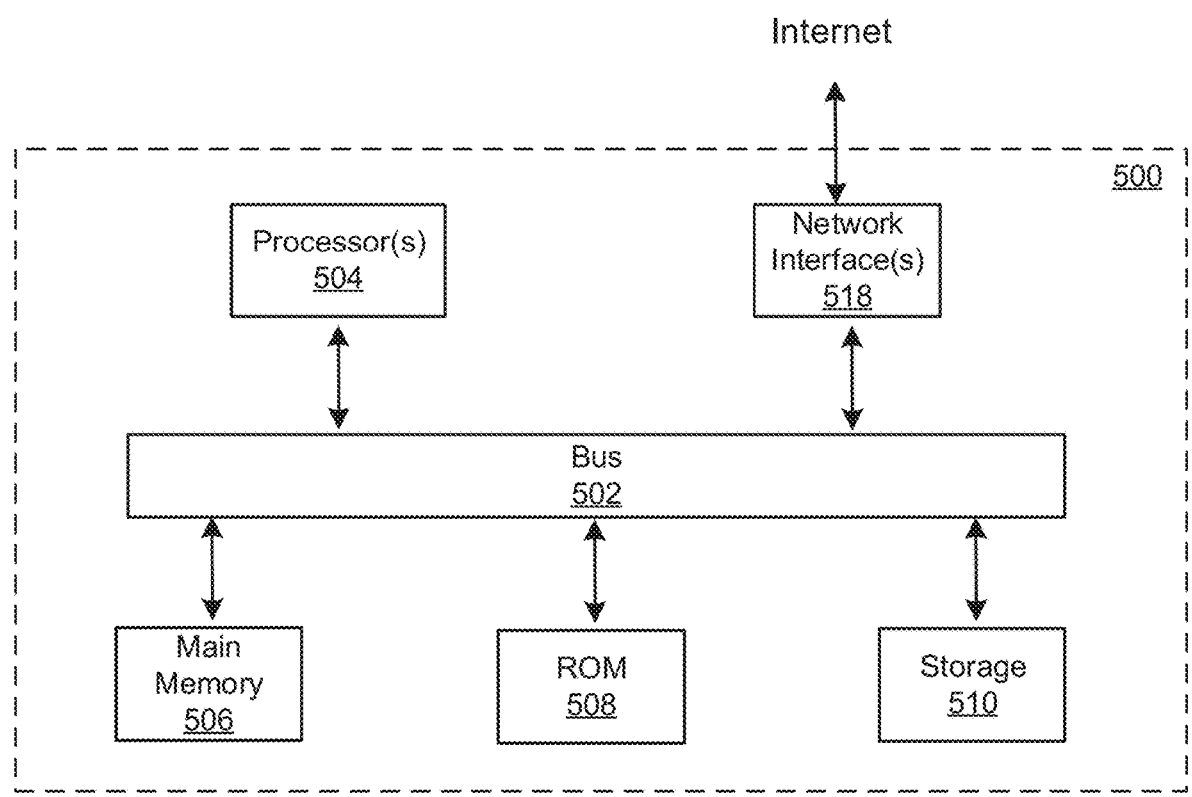
FIG. 5 illustrates a block diagram of an example computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm or model. In some embodiments, a machine learning algorithm or model may not explicitly program computers to perform a function, but can learn from training data to make a predictions model (a trained machine learning model) that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A method for estimating an arrival time associated with a trip, comprising:
receiving, through a network interface, trip information including an origin and a destination of the trip;
determining, by a processor, a route connecting the origin and the destination, the route including a plurality of road segments;
receiving, through the network interface, transportation information associated with the road segments of the route;
extracting, by the processor, global features and local features from the transportation information, each global feature indicative of characteristics involving at least two of the road segments, each local feature indicative of characteristics related to an individual one of the road segments; and
applying, by the processor, a machine learning model to estimate the arrival time, wherein the machine learning model comprises a first neural network dedicated to process the global features and a second neural network dedicated to process the local features, wherein the first neural network is distinct from the second neural network.

2. The method of claim 1, wherein extracting the global features includes extracting features uniform to the at least two road segments.

3. The method of claim 1, wherein the global features include a shape encompassing the route.

4. The method of claim 1, wherein the local features include real-time traffic data associated with the respective road segments.

5. The method of claim 1, wherein the first neural network is a feedforward neural network and the second neural network is a recurrent neural network.

6. The method of claim 1, wherein the second neural network comprises a sequence of layers corresponding to a sequence of the road segments, wherein each layer is configured to process local features of a road segment in the corresponding sequence of road segments.

7. The method of claim 1, wherein the machine learning model further comprises a third neural network dedicated to process the global features, the third neural network is configured to obtain a feature product between two global features.

8. The method of claim 1, wherein the machine learning model further comprises a multilayer perceptron network configured to process data obtained from the first neural network and the second neural network.

9. The method of claim 1, wherein the trip information is received from a device used by a user to make a ride order for transportation from the origin to the destination.

10. The method of claim 1, wherein the first neural network and the second neural network of the machine learning model are collectively trained using historical trips and corresponding historical travel times.

11. A system for estimating an arrival time associated with a trip, comprising:
a network interface configured to receive trip information including an origin and a destination of the trip, and transportation information associated with a route connecting the origin and the destination, the route including a plurality of road segments;
a storage device configured to store a machine learning model; and
a processor configured to:
extract global features and local features from the transportation information, each global feature indicative of characteristics involving at least two of the road segments, each local feature indicative of characteristics related to an individual one of the road segments; and
apply a machine learning model to estimate the arrival time, wherein the machine learning model comprises a first neural network dedicated to process the global features and a second neural network dedicated to process the local features, wherein the first neural network is distinct from the second neural network.

12. The system of claim 11, wherein to extract the global features, the processor is further configured to extract features uniform to the at least two road segments.

13. The system of claim 11, wherein the local features include real-time traffic data associated with the respective road segments.

14. The system of claim 11, wherein the first neural network is a feedforward neural network and the second neural network is a recurrent neural network.

15. The system of claim 11, wherein the second neural network comprises a sequence of layers corresponding to a sequence of the road segments, wherein each layer is configured to process local features of a road segment in the corresponding sequence of road segments.

16. The system of claim 1, wherein the machine learning model further comprises a multilayer perceptron network configured to process data obtained from the first neural network and the second neural network.

17. The system of claim 1, wherein the network interface is further configured to receive the trip information from a device used by a user to make a ride order for transportation from the origin to the destination.

18. The system of claim 11, wherein the processor is further configured to:
determine a plurality of routes connecting the origin and the destination;
estimating an arrival time for each route by applying the machine learning model; and
make a recommendation of a route among the plurality of routes associated with the shortest arrival time.

19. The system of claim 11, wherein the first neural network and the second neural network of the machine learning model are collectively trained using historical trips and corresponding historical travel times.

20. A non-transitory computer-readable storage medium storing instructions that, when executed by a processor, cause the processor to perform a method for estimating an arrival time associated with a trip, the method comprising:
receiving trip information including an origin and a destination of the trip;
determining a route connecting the origin and the destination, the route including a plurality of road segments;
receiving transportation information associated with the road segments of the route;
extracting global features and local features from the transportation information, each global feature indicative of characteristics involving at least two of the road segments, each local feature indicative of characteristics related to an individual one the road segments; and
applying a machine learning model to estimate the arrival time, wherein the machine learning model comprises a first neural network dedicated to process the global features and a second neural network dedicated to process the local features, wherein the first neural network is distinct from the second neural network.

* * * * *